United States Patent
Montesalvo et al.

(10) Patent No.: US 11,105,112 B2
(45) Date of Patent: Aug. 31, 2021

(54) AUTOMOTIVE TENT

(71) Applicant: PATRIOT CAMPERS HOLDINGS PTY. LTD., Molendinar (AU)

(72) Inventors: Justin Montesalvo, Nerang (AU); Simon Noel Pearce, Sunnybank Hills (AU)

(73) Assignee: Patriot Campers Holdings Pty Ltd., Molendinar (AU)

( * ) Notice: Subject to any disclaimer, the term of this patent is extended or adjusted under 35 U.S.C. 154(b) by 0 days.

(21) Appl. No.: 17/152,235

(22) Filed: Jan. 19, 2021

(65) Prior Publication Data

US 2021/0164257 A1 Jun. 3, 2021

Related U.S. Application Data

(63) Continuation of application No. 16/933,375, filed on Jul. 20, 2020.

(30) Foreign Application Priority Data

Jul. 25, 2019 (AU) .............................. 2019902640

(51) Int. Cl.
*E04H 15/06* (2006.01)
*B60P 3/38* (2006.01)
*E04H 15/54* (2006.01)
*E04H 15/38* (2006.01)

(52) U.S. Cl.
CPC ................ *E04H 15/06* (2013.01); *B60P 3/38* (2013.01); *E04H 15/54* (2013.01); *E04H 15/38* (2013.01)

(58) Field of Classification Search
CPC .............................. E04H 15/06; E04H 15/644
See application file for complete search history.

(56) References Cited

U.S. PATENT DOCUMENTS

| | | | | |
|---|---|---|---|---|
| 3,018,782 A | * | 1/1962 | Hershberger | E04H 15/06 135/88.16 |
| 3,375,836 A | * | 4/1968 | Domeneghetti | E04H 15/06 135/88.18 |
| 3,454,020 A | * | 7/1969 | Grossman | B60P 3/38 135/116 |
| 4,099,534 A | * | 7/1978 | Corbin | E04H 15/06 135/150 |

(Continued)

FOREIGN PATENT DOCUMENTS

| | | | |
|---|---|---|---|
| CN | 208010030 U | * | 10/2018 |
| CN | 208564146 U | * | 3/2019 |

(Continued)

OTHER PUBLICATIONS

English translation of CN 208010030 U (LU reference), espacenet.com.*

*Primary Examiner* — David R Dunn
*Assistant Examiner* — Danielle Jackson
(74) *Attorney, Agent, or Firm* — Tucker Ellis LLP

(57) ABSTRACT

The present application relates to an automotive tent for fastening to a vehicle. The tent includes a base for fastening to the vehicle. A retractable cover is provided for retracting during transport, and expanding from the base to define a sleeping space. Advantageously, the cover may be readily erected by expanding the cover from the base to define the sleeping space. The cover may be collapsible.

18 Claims, 5 Drawing Sheets

(56) References Cited

U.S. PATENT DOCUMENTS

| | | | | |
|---|---|---|---|---|
| 4,548,438 | A * | 10/1985 | Myers | E04H 15/38 |
| | | | | 296/160 |
| 8,826,928 | B2 * | 9/2014 | Zhou | E04H 15/46 |
| | | | | 135/151 |
| 9,169,665 | B1 * | 10/2015 | Zhou | E04H 15/48 |
| 9,499,999 | B2 * | 11/2016 | Zhou | E04H 15/02 |
| 9,567,767 | B2 * | 2/2017 | Kendrick | E04H 15/38 |
| 9,995,055 | B1 * | 6/2018 | Currid | E04H 15/64 |
| 10,077,574 | B1 * | 9/2018 | Currid | E04H 15/48 |
| 10,465,412 | B1 * | 11/2019 | Currid | B60R 9/045 |
| 10,590,675 | B2 * | 3/2020 | Zhou | E04H 15/008 |
| 10,596,951 | B1 * | 3/2020 | Williams | E04H 15/06 |
| 10,947,753 | B2 * | 3/2021 | Currid | B60R 9/045 |
| 2012/0110721 | A1 * | 5/2012 | Takahashi | B32B 27/12 |
| | | | | 2/458 |
| 2018/0010357 | A1 * | 1/2018 | Zhou | E04H 15/06 |
| 2018/0370415 | A1 * | 12/2018 | Mathiasen | E04H 15/08 |
| 2020/0180498 | A1 * | 6/2020 | Jin | E04H 15/06 |

FOREIGN PATENT DOCUMENTS

| | | | | |
|---|---|---|---|---|
| DE | 2554575 | A1 * | 6/1977 | E04H 15/06 |
| DE | 2751561 | A1 * | 5/1979 | B60P 3/38 |
| DE | 3332205 | A1 * | 3/1985 | B60P 3/38 |
| WO | WO-2015089727 | A1 * | 6/2015 | E04H 15/38 |
| WO | WO 2021012661 | A1 * | 1/2021 | |

* cited by examiner

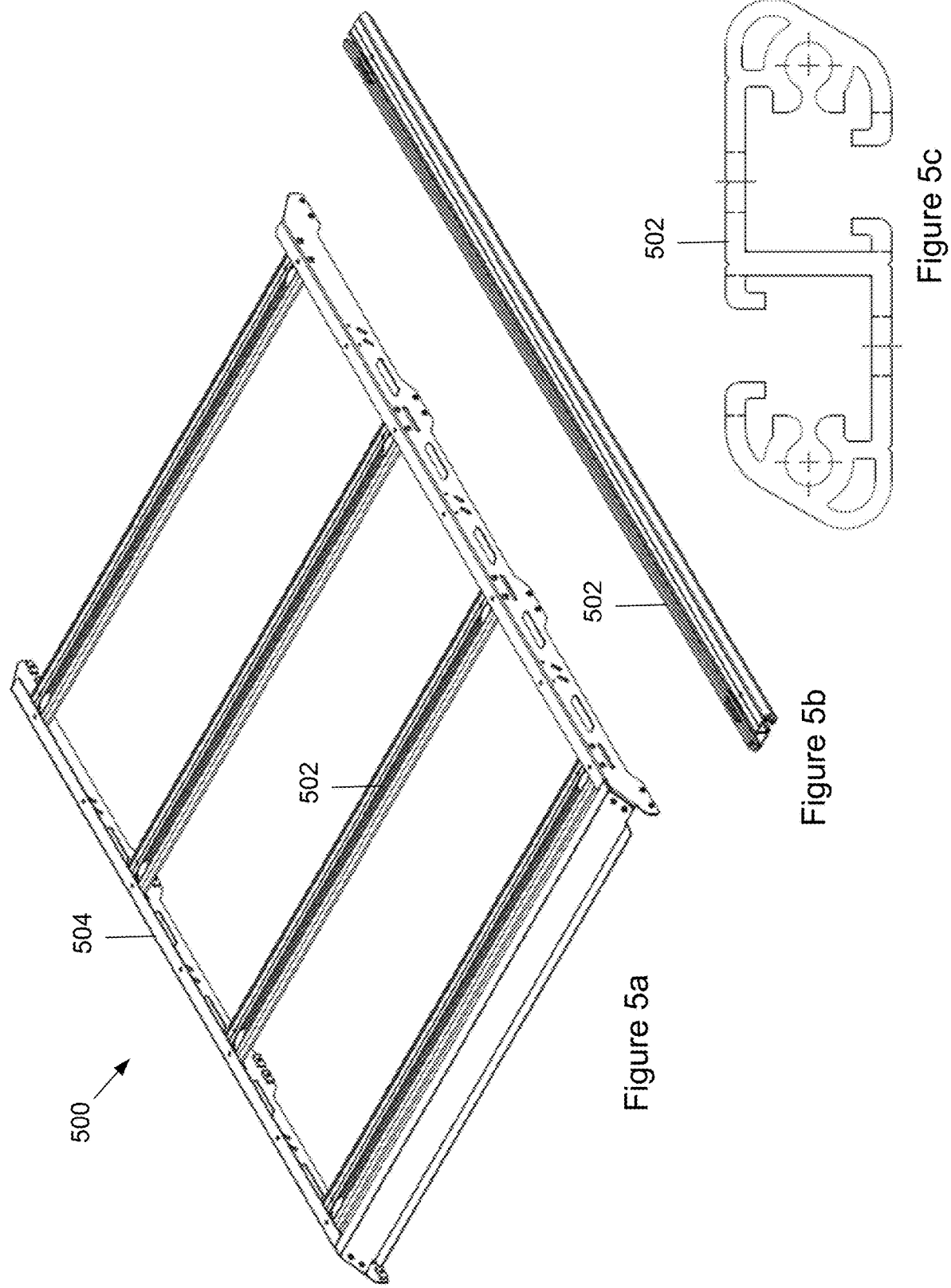

AUTOMOTIVE TENT

RELATED APPLICATION DATA

This application is a continuation of U.S. patent application Ser. No. 16/933,375 filed Jul. 20, 2020, which claims priority to AU 2019902640, filed Jul. 25, 2019, which are hereby incorporated herein by reference.

TECHNICAL FIELD

The present invention relates to an automotive tent. The present invention has particular, although not exclusive application to roof tents for mounting to the roof of vehicles.

BACKGROUND

The reference to any prior art in this specification is not, and should not be taken as an acknowledgement or any form of suggestion that the prior art forms part of the common general knowledge.

Automotive roof tents are fitted to four-wheel-drive (4WD) vehicles when camping. The roof tent is stored in a canvas bag for transport. In practice, it is difficult or awkward to remove the roof tent from the bag during erection of the tent, and to return the tent to the bag afterwards. The bag zipper is difficult to use in cold weather when hands are also cold and often breaks, leading to the undesirable ingress of dust and water.

Embodiments of the preferred embodiment provide a means for improving erection and/or storage of the roof tent.

SUMMARY OF THE INVENTION

According to one aspect of the present invention, there is provided an automotive tent for fastening to a vehicle, the tent including:
  a base for fastening to the vehicle; and
  a retractable cover for retracting during transport, and expanding from the base to define a sleeping space.

Advantageously, the cover may be readily erected by expanding the cover from the base to define the sleeping space. The cover may be collapsible.

The tent may be wedge-shaped. Preferably, the retracted cover folds flat with the base. The cover may include a rigid panel pivotally mounted to the base, and which forms a lid of the retracted cover. The tent may include a biasing means for biasing the cover away from the base.

The cover may further include at least one flaccid sheet advantageously stowed beneath the lid. The sheet may extend upwardly from the base to the panel. The sheet may include a honeycomb weave. The sheet may define an end wall from which opposing side walls extend. The tent may further include at least one rib for supporting the sheet. The rib may pivot. The rib may be biased outwardly to keep the sheet of the cover taught when erect. The tent may further include a cover support for supporting a sheet of the cover. The cover support may include one or more flexible rods.

Advantageously, the base may include a rigid panel for supporting at least one sleeping person. The base may be fitted directly to the vehicle without existing roof racks. Alternatively, the base may be fastened to roof racks of the vehicle.

Each rigid panel may include frame extrusions and corner fasteners for fastening adjacent frame extrusions together. Each panel may include a tubular (e.g. hexagonal) body. The frame extrusions may receive the body.

The tent may further include a ladder for gaining access to the tent. The ladder may be extendable (e.g. telescopic). The ladder may hook into the base.

The cover may include LED lighting. The lighting may clip into a frame extrusion. The cover may further include accessory mounts for mounting accessories. The tent may include a detachable awning for extending from the cover adjacent he vehicle. The tent may include a skylight. The tent may include a fan.

The tent may further include a mattress, stopping short of the length of the base. The tent may optionally include a roof-rack assembly for fitting to the cover.

According to another aspect of the present invention, there is provided a method of producing an automotive tent panel, the method including:
  receiving a body within frame elements; and
  fastening the frame elements together with corner fasteners.

According to another aspect of the present invention, there is provided a method of producing an automotive tent, the method including:
  producing a pair of the tent panels;
  pivotally mounting the panels together; and
  fastening at least one sheet between the panels.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1a is a rear perspective view of an automotive tent in accordance with an embodiment of the present invention;

FIG. 1b is a front perspective view of the automotive tent of FIG. 1a;

FIG. 5a is a perspective view of a roof-rack assembly for fitting to the tent of FIG. 1;

FIG. 5b is a perspective view of a cross bar of the roof-rack assembly of FIG. 5a; and FIG. 5c is a perspective view of the cross bar of FIG. 5b.

DETAILED DESCRIPTION OF PREFERRED EMBODIMENTS

Figure 1:
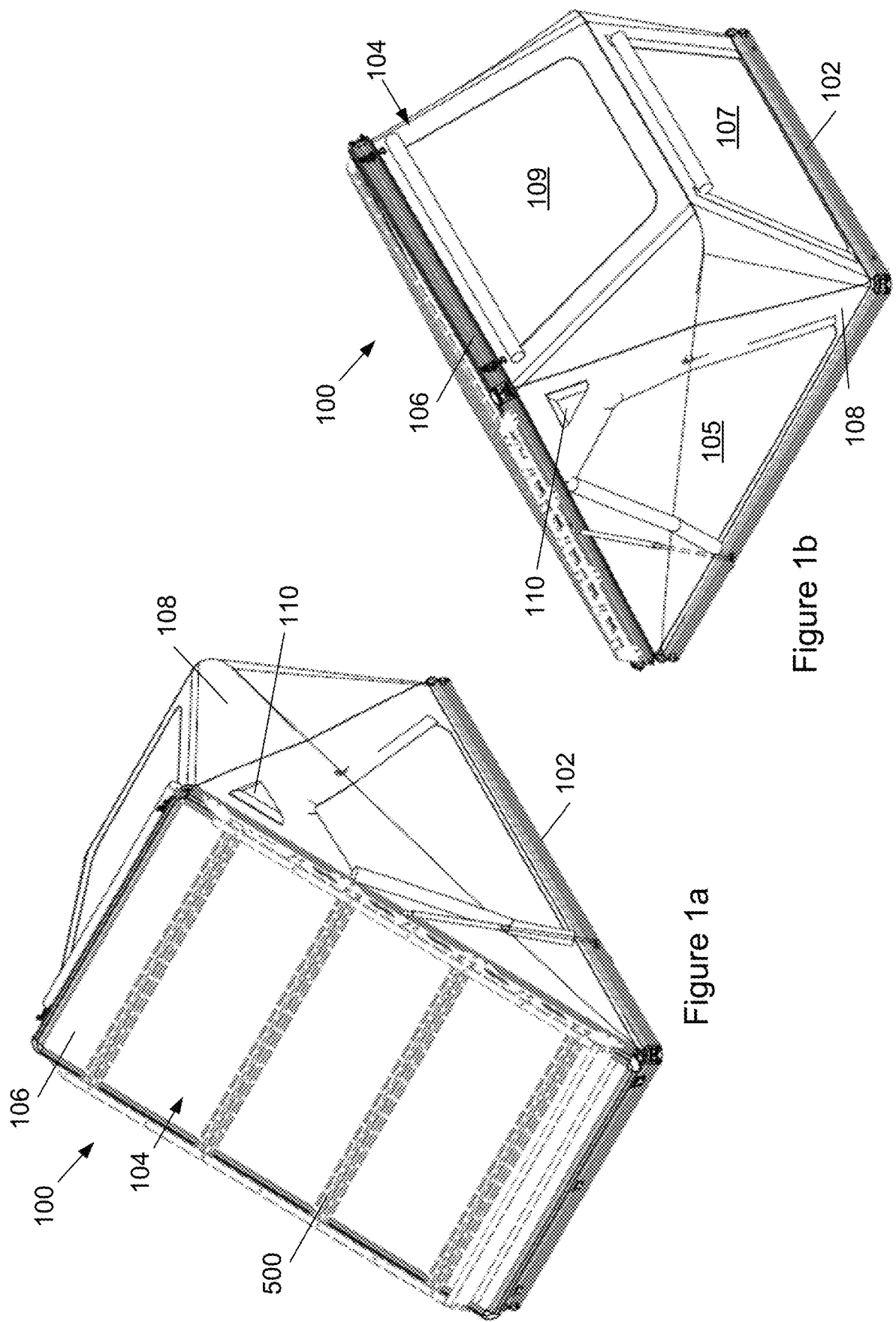

According to an embodiment of the present invention, there is provided an automotive tent 100 for fastening to the roof or tray of a vehicle as shown in FIG. 1. The wedge-shaped tent 100 includes a rigid base 102 for fastening to the vehicle. The tent 100 further includes a retractable cover 104 for retracting flat during transport (see FIG. 4), and expanding from the base to define a sleeping space (see FIG. 2).

Advantageously, the retractable cover 104 can be readily erected by expanding the retractable cover 104 from the rigid base 102, like a clam shell opening, to rapidly define the internal sleeping space. The rigid base 102 can be fitted directly to the vehicle without existing roof racks, and using vehicle specific mounting kits typically manufactured from sheet metal.

Returning to FIG. 1, the retractable cover 104 includes a rigid panel 106 pivotally mounted to the rigid base 102 with a rear PVC strip hinge, and the rigid panel 106 forms a lid of the retracted cover 104. The retractable cover 104 further includes at least one flaccid fabric sheet 108 advantageously stowed beneath the lid. The fabric sheet 108 extends upwardly between the rigid base 102 and the sloping rigid panel 106, defining two opposing side walls and a pointed front-end wall with each wall providing a person access.

The fabric sheet 108 has various fly screen inserts covered by roll-up fabric covers. The fabric sheet 108 defines two side doors 105 and a front-end door 107, as well as a skylight 109 located above the front-end door. Notably, the tent 100 includes electric air-circulation fans which can be located in opposite fan apertures 110 (or pockets) defined in the peak of the retractable cover 104. The tent 100 is cooler in a hot climate and is condensation free owing to the cross-airflow.

Figure 2:
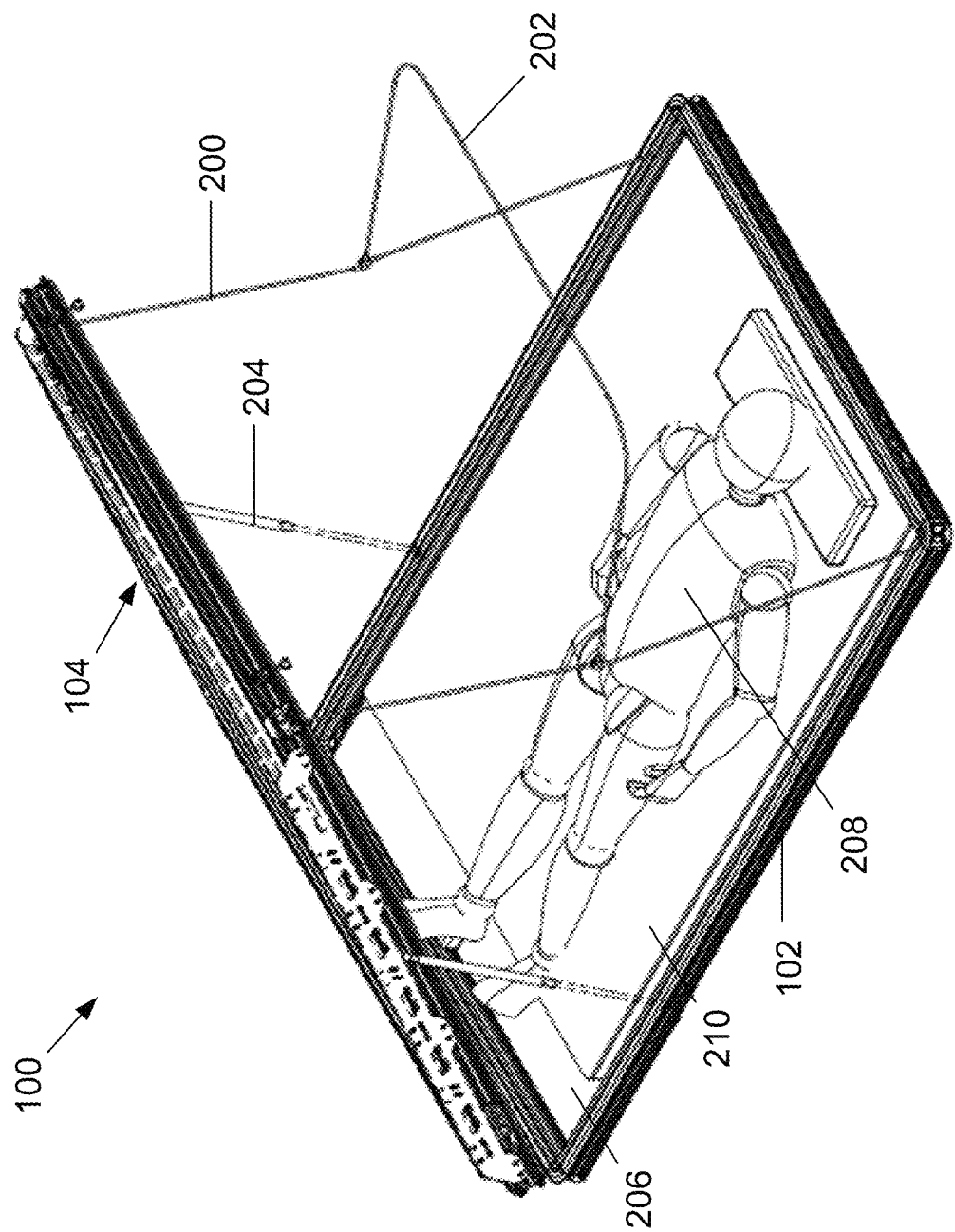
FIG. 2 is a front perspective view of the automotive tent of FIG. 1b with the fabric sheet removed.

Turning to FIG. 2, the tent 100 further includes a pair of opposing cover supports 200 for supporting the fabric sheet 108 of the retractable cover 104. Each cover support 200 includes a pair of fiberglass rods interconnected by a central pivot, and also pivotally mounted at the other opposite ends. The rods may be sewn into the fabric sheet 108.

Furthermore, the tent 100 includes a U-shaped rib 202 for fastening to and supporting the fabric sheet 108. The rib 202 pivots about the central pivot of the cover support 200. The tent 100 also includes a biasing means 204, in the form of opposing pneumatic struts, for biasing the retractable cover 104 away from the rigid base 102 to an expanded configuration.

The rigid base 102 also includes a rigid panel 206 for supporting at least one sleeping person 208. The tent 100 further includes a mattress 210, stopping short of the rear length of the rigid base 102 so that the person's feet have additional room between the rigid base 102 and retractable cover 104.

Figure 3:
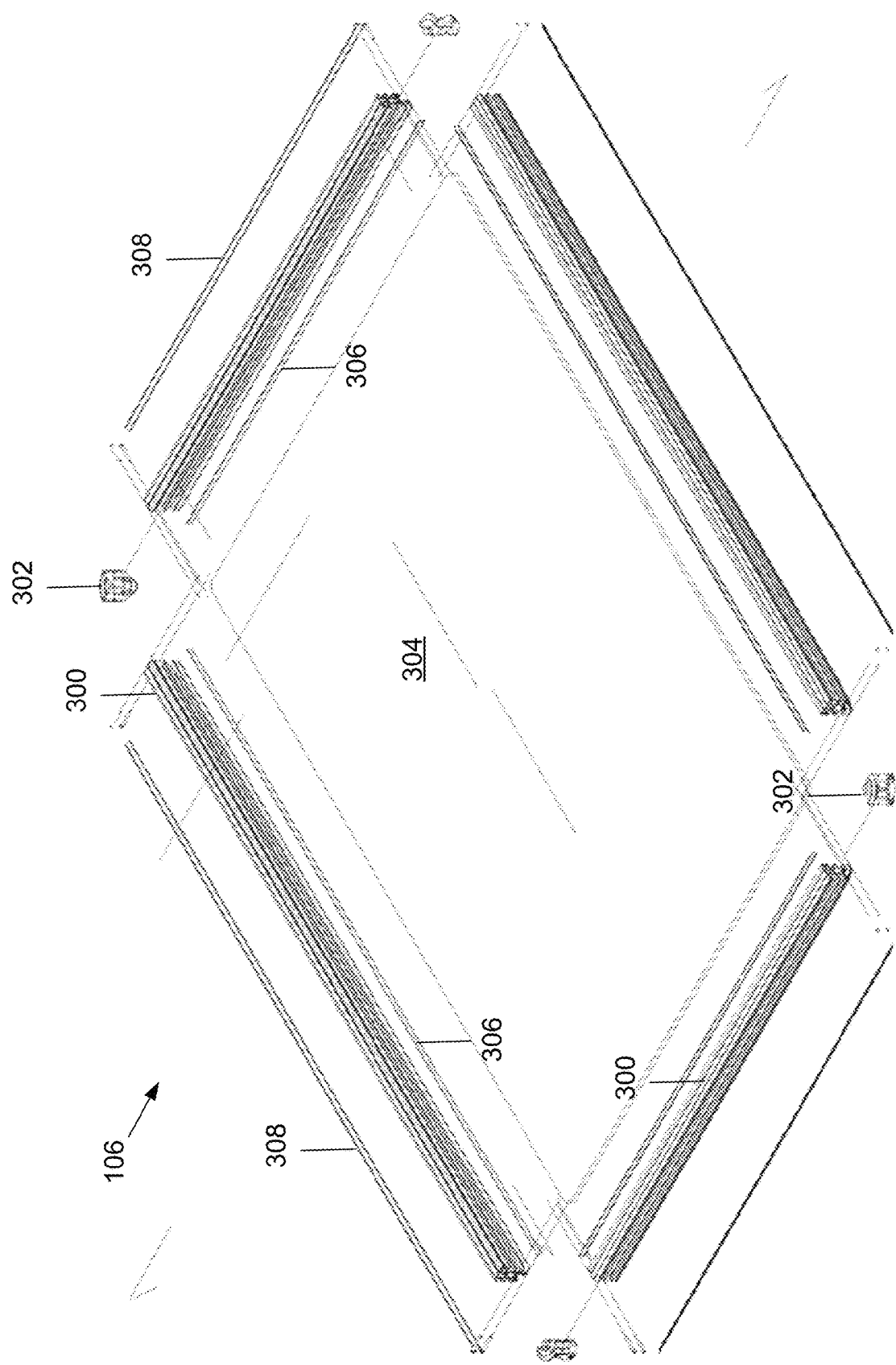
FIG. 3 is an exploded perspective view of a base of the automotive tent of FIG. 1.

FIG. 3 shows the lightweight cover rigid panel 106 which is of like construction to the rigid base 102, and is easy to assemble and strong. The cover rigid panel 106 includes four capping aluminium frame extrusions 300, and four molded corner fasteners 302 for fastening adjacent aluminium frame extrusions 300 together. The rigid panel 106 also includes a lightweight tubular (e.g. hexagonal) planar body 304. The planar body 304 is made from aircraft grade layered aluminium with a honeycomb formed centre, and is light weight, strong, and offer great thermal barrier characteristics to help block sun radiation.

The aluminium frame extrusions 300 receive the planar body 304 and corner fasteners 302 with a friction fit. The aluminium frame extrusions 300 are coated (e.g. powder/paint/anodised). The cover rigid panel 106 also includes four internal LED lighting strips 306, and four external LED lighting strips 308. The lighting strips 306, 308 clip or insert into the aluminium frame extrusions 300 to form a flush aerodynamic finish, and include a plastic diffuser. The lighting strips 308 in the rigid base 102, around the vehicle, shine at an angle and down onto the ground. The lighting strips 306 provide an integrated lighting solution, avoiding the need for a user to otherwise purchase several other lighting packages that mount externally to the vehicle and are vulnerable to being damaged when driving by tree branches and the like.

The corner fasteners 302 are shaped to enable fabric sheet keders, nuts and bolt heads to be axially fed and slid into the aluminium frame extrusions 300.

Figure 4:
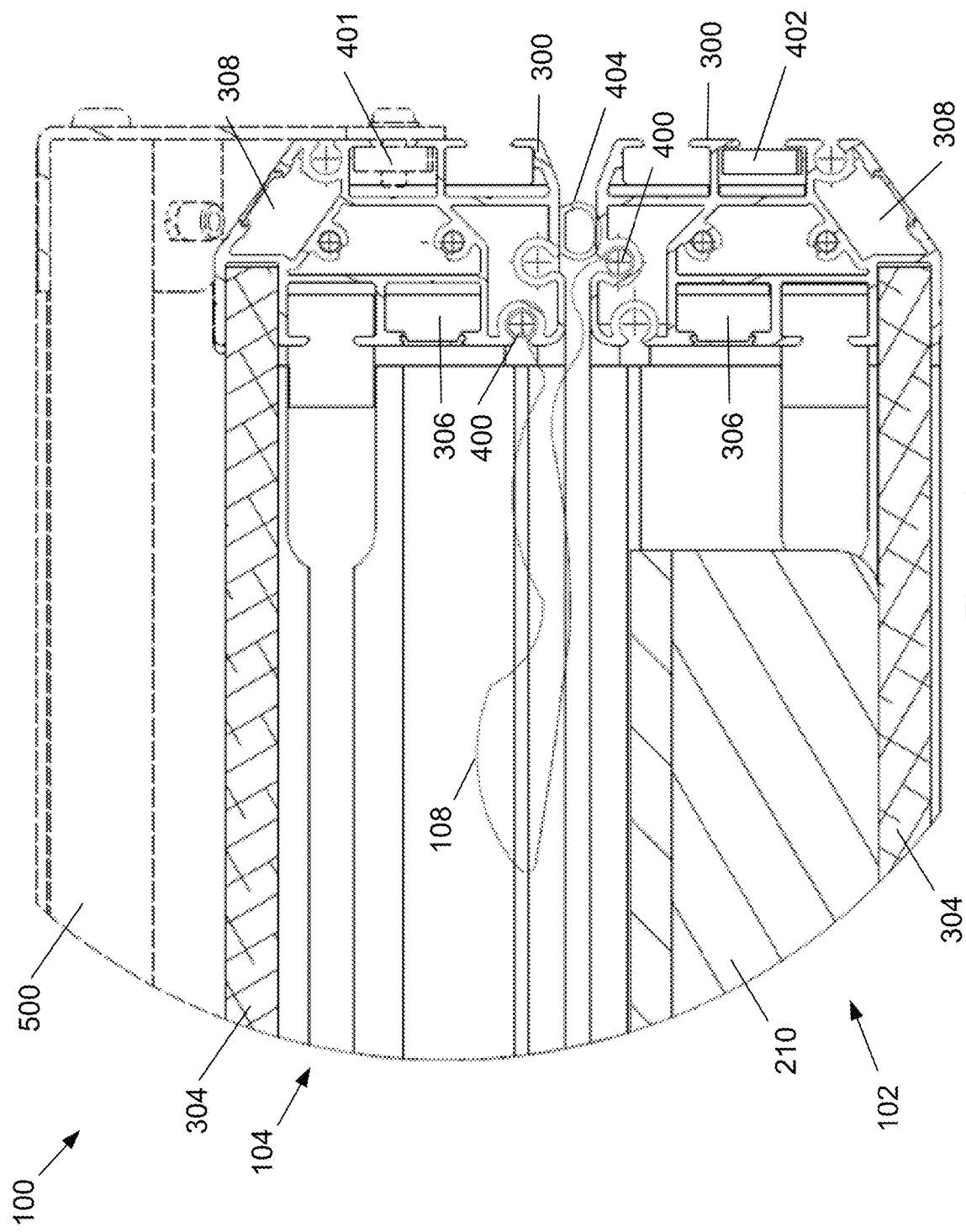
FIG. 4 is a front-end sectional view of the automotive tent of FIG. 1 in a retracted configuration.

FIG. 4 shows the retractable cover 104 folded flat with the rigid base 102 for transport, with the fabric sheet 108 safely stored inside. Advantageously, the collapsed tent 100 has a low profile when closed on the vehicle roof which is about ⅓ of a conventional roof tent packed height. Keders 400 of the fabric sheet 108 are received in recesses of the aluminium frame extrusions 300.

Other cavities defined by the aluminium frame extrusions 300 allow for fitting, transporting and using unlimited accessories including wiring which can be hidden inside the extrusion and not exposed. The cavities define a small leg to allow nuts 401 to be held captive within the extrusion profile when slid in from an open end. These nuts 401 can then be used to mount and attach a variety of things such as the rear PVC hinges and gas strut 204 with a bolted connection. They also allow for (optional) custom brackets that can hold 4wd accessories, awnings, etc.

The tent 100 can include a detachable kedered awning or shade cloth 402 for feeding into and extending from the extrusions 300 adjacent the vehicle. A seal 404 is provided between the retractable cover 104 and the rigid base 102, with the adjacent mouth defined by the aluminium frame extrusions 300 falling away to form a water runoff.

Turning to FIG. 5a, the tent 100 optionally includes a roof-rack assembly 500 for fitting to the retractable cover 104 of the roof tent 100 (see assembly depicted by dashed lines in FIG. 1a) to provide a roof rack when the tent is collapsed.

The roof-rack assembly 500 includes extruded aluminum cross bars 502, extending between sheet metal side brackets 504, that form accessory mounts for mounting accessories.

The tent 100 further includes a ladder for gaining access to the tent 100 at heights up to 2 m. The ladder is extendable (e.g. telescopic), and hooks into the frame extrusion 300 of the rigid base 102 in use and can be stowed inside the shell, formed by the retractable cover 104 folded flat with the rigid base 102, when traveling.

The tent 100 provides a simple assembly with a low number of parts. Basically, the entire tent 100 is made up of 5 main parts (not including hinges, gas struts, latches); namely the rigid base/lid 102, rigid panel 106, corner cap 302, aluminium frame extrusions (2 lengths) 300, and tent (fabric) sheets 108 that friction fit together, are sealed by silicone or double-sided tape, and mechanically finished with 4 screws in each corner cap 302 that tap into the aluminium frame extrusions 300.

The fabric sheet 108 includes a synthetic fabric that has a honeycomb weave. It is waterproof, SPF50 rated, fire retardant treated, and reflects heat due to a silver aluminised underside coating. The fabric sheet 108 also includes fabric sides and doors made from a breathable canvas polycotton blend, also being fire retardant and SPF50 rated.

In use, the tent 100 can be readily erected from the storage position shown in FIG. 4.

A latch latching the retractable cover 104 to the rigid base 102 is released, and the gas strut 204 separates the retractable cover 104 from the rigid base 102.

In turn, the fabric sheet 108 forms the upright walls, and the rib 202 pushes outwardly to keep the fabric sheet 108 taut. The cover support rods (fiberglass or aluminium) 200 have a plastic moulded pivot on each end and operate like scissors. As the rigid shell comes open, the end pivots are separated increasing the angle between them. This forces the centre pivot away from the shell PVC hinge. The centre pivot is also connected to the rib 202, so this is in turn pushes away from the centre pivot. Because it is contained by the tent fabric, the rib 202 forces the tent shape in FIG. 1.

Once the tent 100 is erected, accessories can then be coupled to the accessory cover cross bars 502 and the extrusions 300.

Conversely, the tent 100 can be retracted for transport by simply pulling down on the retractable cover 104 and latching it to the rigid base 102 with the fabric sheet 108 safely stored inside. As the rigid panel lid 106 is closed, it forces the rods 200 to collapse and reverse the same process to collapse the tent fabric sheet 108.

A person skilled in the art will appreciate that many embodiments and variations can be made without departing from the ambit of the present invention.

In one embodiment, the rigid base 102 may be fastened to existing roof racks of the vehicle.

In one embodiment, an optional elastic line arrangement may take the place of the cover supports 200. The rib 202 is biased outwardly to keep the sheet of the cover taut when erect. With the same outcome as described above, the bow is pushed forward by the fabric tension as the shell opens. The collapsing part is different, and requires the user to hook on long elastic/rubber straps between the PVC hinge channel and the ends of the bow. These pull the bow inside the shell so as to not foul the seal and interfere with closing.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An automotive tent for fastening to a vehicle, the tent including:
   a base for fastening to the vehicle;
   a retractable cover for retracting during transport, and expandable from the base to define a sleeping space in an expanded configuration of the retractable cover, wherein the retractable cover is hinged to the base and moveable relative to the base to define the expanded configuration of the retractable cover;
   a cover support for supporting the retractable cover when expanded from the base, the cover support including first and second rods interconnected by a pivot such that the first and second rods are pivotable relative to one another; and
   at least one rib for supporting at least one flaccid sheet of the retractable cover, wherein the at least one rib is configured to pivot about the pivot of the cover support.

2. The automotive tent as claimed in claim 1, wherein the retractable cover is collapsible and readily erected by expanding the cover from the base to define the sleeping space which is wedge-shaped.

3. The automotive tent as claimed in claim 1, wherein the retractable cover folds flat with the base.

4. The automotive tent as claimed in claim 3, wherein the retractable cover includes a rigid panel pivotally mounted to the base, and which forms a lid of the retractable cover.

5. The automotive tent as claimed in claim 4, further including the at least one flaccid sheet stowed beneath the lid.

6. The automotive tent as claimed in claim 5, wherein the at least one flaccid sheet extends upwardly from the base to the rigid panel.

7. The automotive tent as claimed in claim 5, wherein the at least one flaccid sheet includes a honeycomb weave, the at least one flaccid sheet defining an end wall from which opposing side walls extend.

8. The automotive tent as claimed in claim 5, wherein the at least one rib is biased outwardly to keep the at least one flaccid sheet of the retractable cover taut when erect.

9. The automotive tent as claimed in claim 1, further including a biasing means for biasing the retractable cover away from the base.

10. The automotive tent as claimed in claim 1, wherein the base includes a rigid panel for supporting at least one sleeping person, the base being fitted directly to the vehicle without existing roof racks or fastened to roof racks of the vehicle.

11. The automotive tent as claimed in claim 1, wherein the base and the retractable cover both include rigid panels, each rigid panel including frame extrusions and corner fasteners for fastening adjacent frame extrusions together.

12. The automotive tent as claimed in claim 1, further including a ladder for gaining access to the tent, the ladder being extendable and able to hook into the base.

13. The automotive tent as claimed in claim 1, wherein the retractable cover includes LED lighting able to clip into a frame extrusion.

14. The automotive tent as claimed in claim 1, further including a detachable awning for extending from the retractable cover adjacent the vehicle.

15. The automotive tent as claimed in claim 1, further including a skylight, a fan and/or a roof-rack assembly for fitting to the retractable cover.

16. The automotive tent as claimed in claim 1, further including a mattress that stops short of a length of the base.

17. The automotive tent as claimed in claim 1, wherein the pivot is a central pivot of the cover support.

18. The automotive tent as claimed in claim 1, wherein the cover support is a first cover support, and the automotive tent further includes a second cover support.

* * * * *